(12) United States Patent
Kalb

(10) Patent No.: US 6,444,287 B1
(45) Date of Patent: Sep. 3, 2002

(54) HEAT BLOCKER

(76) Inventor: Michael Kalb, 521 W. Mathews Ct., Oneida, IL (US) 61467

(*) Notice: Subject to any disclaimer, the term of this patent is extended or adjusted under 35 U.S.C. 154(b) by 72 days.

(21) Appl. No.: 09/628,733

(22) Filed: Jul. 28, 2000

(51) Int. Cl.[7] .................................................. B32B 3/06
(52) U.S. Cl. .......................... 428/100; 428/99; 428/102
(58) Field of Search .................................. 138/159, 147, 138/158; 150/157; 428/102, 99, 100

(56) References Cited

U.S. PATENT DOCUMENTS 5,139,839 A * 8/1992 Lim ............................ 428/102

* cited by examiner

Primary Examiner—Alexander S. Thomas
(74) Attorney, Agent, or Firm—Michael I. Kroll

(57) ABSTRACT

The present invention 10 discloses a high temperature insulation blanket for an exhaust system of an internal combustion engine. The blanket 10 can be selectively manufactured to encompass any engine parts deemed desirable by the user. All sides of the insulative blanket 10 have a high temperature abrasive resistant outer shell material 24 fixedly attached thereto. The high temperature insulative blanket is comprised of a ceramic core 22 having an interior engine engaging layer and an exterior atmospheric air layer. The interior layer is comprised of an inconel or monel mesh material 20 that provides a spacing between the engine components and the ceramic fill 22. An inconel or monel liner 32 prevents any engine fluids from wicking into the ceramic fill 22. The exterior layer 24 is comprised of a Teflon layer that is substantially impervious to petroleum based products and solvents. The present invention 10 provides three means of closure for the insulative blanket. The first 26 being a spring closure provides means for quick installation and/or removal of the insulative blanket. The second means of closure is comprised of industrial grade hook and loop material 34 fixedly attached to the edges of the insulative blanket with each edge having the mating member of the hook and loop material. This method of closure also provides a quick and easy means for installing the insulative blanket. The third method of closure involves hooks 38 being provided on one edge of the insulative blanket and eyelets 40 provided along the opposed edge of the insulative blanket wherethrough a wire-like thread 36 can be laced and engaged around the hook elements.

17 Claims, 9 Drawing Sheets

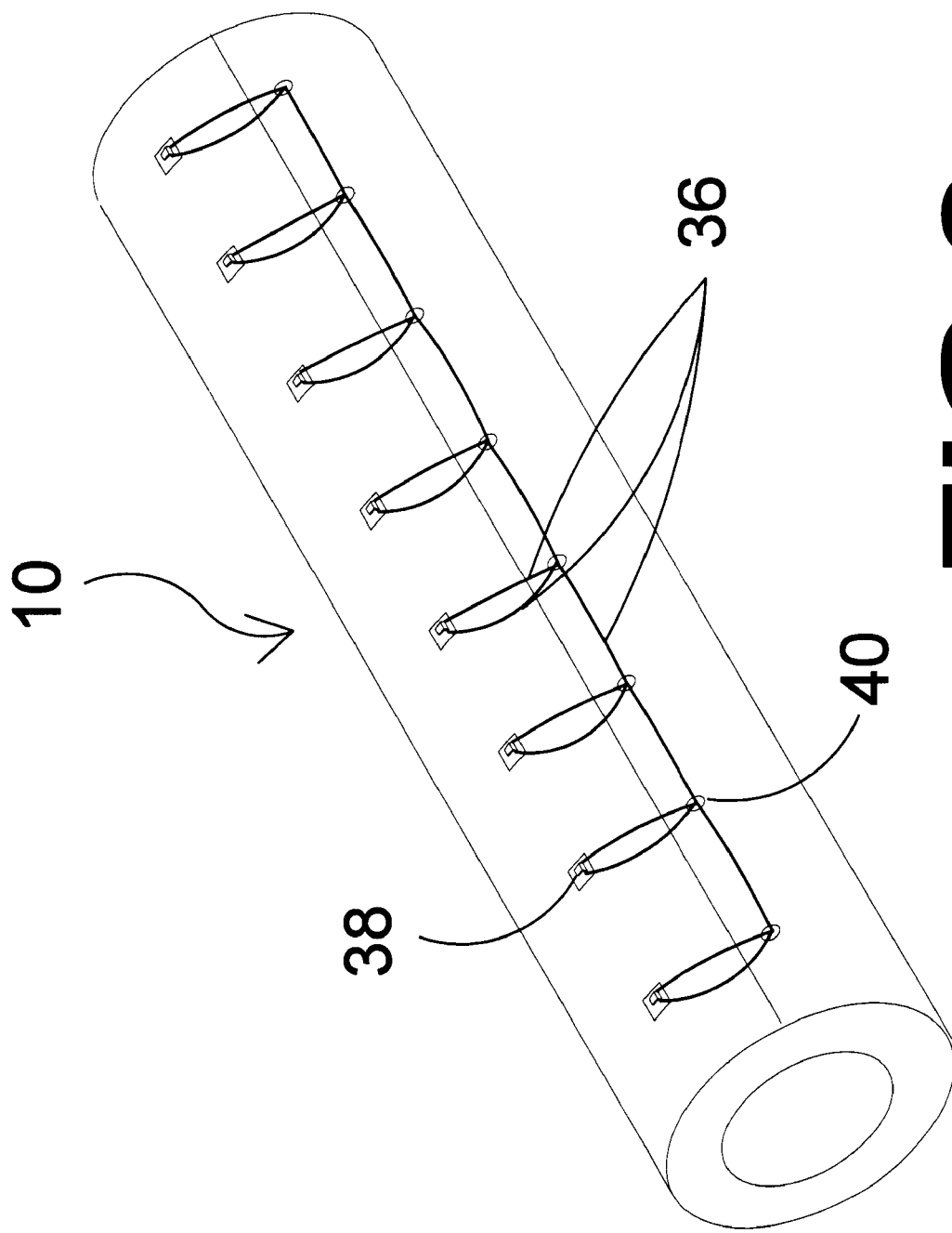

HEAT BLOCKER

BACKGROUND OF THE INVENTION

1. Field of the Invention

The present invention relates generally to insulating blankets and more specifically to insulation blankets for engine exhaust systems. The present invention is a high temperature insulation blanket for combustion engines. The blanket can be selectively manufactured to encompass any engine parts deemed prudent by the user. All edges of the insulative blanket have a high temperature abrasive resistant material fixedly attached thereto. The high temperature insulative blanket is comprised of a ceramic core having an interior engine engaging layer and an exterior atmospheric air layer. The interior layer is comprised of an inconel or monel mesh material that provides a spacing between the engine components and the ceramic fill and prevents any engine fluids from wicking into the ceramic fill. The exterior layer is comprised of a Teflon layer that is substantially impervious to petroleum based products and solvents. The exterior layer will extend the life of the insulative blanket.

The present invention provides three means of closure for the insulative blanket. The first comprises a plurality of oppositely opposed riveted studs fixedly positioned along the edge of the insulative blanket and being riveted through the exterior layer. One riveted edge has an L-shaped appendage extending away from the insulative blanket edge. The oppositely opposed rivets have a spring element fixedly positioned thereto having a loop located at the distal end. The aperture of the spring loop can be passed over the L-shaped appendage of the opposing rivet. The spring is of sufficient length as to cause the opposing edges of the insulative blanket to be brought into tensioned engagement. The purpose of the spring closure is to provide means for quick installation and/or removal of the insulative blanket.

The second means of closure is comprised of industrial grade hook and loop material fixedly attached to the edges of the insulative blanket. Each edge having the mating member of the hook and loop material. This method of closure also provides a quick and easy means for installing the insulative blanket.

The third method of closure involves hooks being provided on one edge of the insulative blanket and eyelets provided along the opposed edge of the insulative blanket wherethrough a wire-like thread can be laced and engaged around the hook elements.

2. Description of the Prior Art

There are other eye protection clearing device designed for clearing goggles or face shields. Typical of these is U.S. Pat. No. 5,139,839 issued to EK J. T. Lim on Aug. 18, 1992.

Another patent was issued to Donald A. Nawrocki et al. on Dec. 1, 1992 as U.S. Pat. No. 5,167,060. Yet another U.S. Pat. No. 5,811,168 was issued to Daniel Rasky on Sep. 22, 1998 and still yet another was issued on Aug. 5, 1997 to Wesley L. Holman as U.S. Pat. No. 5,654,060.

Another patent was issued to Mack A. Hounsel on Jun. 2, 1998 as U.S. Pat. No. 5,759,663. Yet another U.S. Pat. No. 5,080,949 was issued to Donald A. Nawrocki on Jan. 14, 1992 Another was issued to Robert A. Carlson on Mar. 25, 1986 as U.S. Pat. No. Des. 4,577,839 and still yet another was issued on Apr. 10, 1990 to Edmond K. Parenti et al. as U.S. Pat. No. 4,915,998.

U.S. Pat. No. 5,139,839

Inventor: EK J. T. Lim

Issued: Aug. 18, 1992

A thermal insulating blanket containing insulation material such as ceramic fibre, rock wool or fibreglass enclosed with a cloth, has a layer of woven metal mesh surrounding the insulation material.

U.S. Pat. No 5,167,060

Inventor: Donald A. Nawrocki

Issued: Dec. 1, 1992

A heat shield is made by stacking a wrapper member made from sheet metal, a flexible ceramic fiber insulation member, and an outer member made from sheet material, and then bending over flanges which extend from the wrapper member. The stacked elements are then bent into desired shape. To make a heat shield for spark plugs, a support member is also included in the stack and provides mounting legs for mounting the heat shield. To make a heat shield for a transmission unit, mounting hardware is connected to the stack with rivets.

U.S. Pat. No 5,811,168

Inventor: Danial Rasky

Issued: Sep. 22, 1998

An improved flexible blanket includes a nickel-based allow foil layer brazed to a nickel-based alloy fabric layer. The fabric layer is stitched to an underlying ceramic insulation layer.

U.S. Pat. No 5,654,060

Inventor: Wesley L. Holman

Issued: Aug. 5, 1997

An insulating blanket for a bulkhead in an engine nacelle comprises a fabric backing layer, a central insulating core, a ceramic precursor-impregnated hot-side fabric layer and as required, erosion-preventing wire mesh. The backing layer comprises a fiberglass fabric. The insulating core comprises a ceramic felt. The hot side layer comprises one or more layers of resins-impregnated fiberglass fabric. The blanket is procured to provide a predetermined geometric shape.

U.S. Pat. No 5,759,663

Inventor: Mack A. Hounsel

Issued: Jun. 2, 1998

A high temperature, abrasion resistant insulating module is described having a sinuously folded ceramic blanket with a lath covering three sides of the folded blanket. The lath has doubled back portions extending into the folds of the blanket on its hot face. To the lath front face of the folded blanket is applied a layer of thermally stable, abrasive resistant material which not only serves as an abrasion shield to the brittle fibrous material of the blanket, but only serves to stabilize the module and to reduce fiber dust.

U.S. Pat. No. Des. 5,080,949

Inventor: Donald A. Nawrocki

Issued: Jan. 14, 1992

A heat shield is made by stacking a wrapper member made of sheet metal, a flexible ceramic fiber insulation member, and an outer member made of sheet material, and then bending over flanges which extend from the wrapper member. The stacked elements are then bent into desired shape. To make a heat shield for spark plugs, a support member is also included in the stack and provides mounting legs for mounting the heat shield. To make a heat shield for a transmission unit, mounting hardware is connected to the stack with rivets.

U.S. Pat. No 4,577,839

Inventor: Robert A. Carlson

Issued: Mar. 25, 1986

A light weight insulator blanket capable of repetitive use of extended duration as a cover, gasket, or the like of a vessel or conduit used in transporting, storing or processing molten or non-molten metal, particularly iron or steel, and in similar applications, including a principal insulator layer of a light weight, flexible, fibrous ceramic material having one or both surfaces covered by a thick protective layer of light weight, flexible fibrous metallic material such as high temperature stainless steel wool, monel metal wool, or multi layer knitted or woven material; the layers are securely bound to each other by metallic fastening means such as high temperature stainless steel wire stitching, staples, or rivets.

While these insulating blankets may be suitable for the purposes for which they were designed, they would not be as suitable for the purposes of the present invention, as hereinafter described. It is thus desirable to provide an insulating blanket designed to meet the rigors of prime power and continues use application such as O.E.M, electrical power generation, marine and oil field needs. It is further desirable to provide an insulating blanket that will prevent personnel injuries, prevent fires and excessive heat in the engine compartment or engine room and will prevent heat from saturating the radiator and causing engine over heating.

SUMMARY OF THE PRESENT INVENTION

The present invention discloses a high temperature insulation blanket for an exhaust system of an internal combustion engine. The blanket can be selectively manufactured to encompass any engine parts deemed desirable by the user. All sides of the insulative blanket have a high temperature abrasive resistant outer shell material fixedly attached thereto. The high temperature insulative blanket is comprised of a ceramic core having an interior engine engaging layer and an exterior atmospheric air layer. The interior layer is comprised of an inconel or monel mesh material that provides a spacing between the engine components and the ceramic fill. An inconel or monel liner prevents any engine fluids from wicking into the ceramic fill. The exterior layer is comprised of a Teflon layer that is substantially impervious to petroleum based products and solvents. The present invention provides three means of closure for the insulative blanket. The first being a spring closure which provides means for quick installation and/or removal of the insulative blanket. The second means of closure is comprised of industrial grade hook and loop material fixedly attached to the edges of the insulative blanket with each edge having the mating member of the hook and loop material. This method of closure also provides a quick and easy means for installing the insulative blanket. The third method of closure involves hooks being provided on one edge of the insulative blanket and eyelets provided along the opposed edge of the insulative blanket wherethrough a wire-like thread can be laced and engaged around the hook elements.

A primary object of the present invention is to provide a high temperature insulation blanket that can be selectively positioned to encompass various engine components.

Another object of the present invention is to provide a high temperature insulation blanket having a ceramic core.

Yet another object of the present invention is to provide a high temperature insulation blanket having a ceramic core positioned between an outer layer and an inner layer.

Still yet another object of the present invention is to provide a high temperature insulation blanket having a Teflon outer layer.

Yet another object of the present invention is to provide a high temperature insulation blanket having an inner mesh layer comprise of monel or inconel material.

Still yet another object of the present invention is to provide a high temperature insulation blanket having an inner mesh layer providing a spacing to prevent engine fluids from wicking into the ceramic core.

Still yet another object of the present invention is to provide a high temperature insulation blanket having an outer Teflon layer providing an exterior surface being substantially impervious to petroleum based products and solvents.

Another object of the present invention is to provide a high temperature insulation blanket having a high temperature abrasive resistant material fixedly attached to all edges of said insulative blanket.

Yet another object of the present invention is to provide a high temperature insulation blanket having spring closure means for selectively encompassing combustion engine component within said insulative blanket.

Still yet another object of the present invention is to provide a high temperature insulation blanket having hook and loop material closure means for selectively encompassing combustion engine component within said insulative blanket. Another object of the present invention is to provide a high temperature insulation blanket having hook, eyelet and line closure means for selectively encompassing combustion engine component within said insulative blanket.

Additional objects of the present invention will appear as the description proceeds.

The present invention overcomes the shortcomings of the prior art by providing an insulation blankets for combustion engine components. The blanket can be selectively manufactured to encompass any engine parts deemed prudent by the user. All edges of the insulative blanket have a high temperature abrasive resistant material fixedly attached thereto. The high temperature insulative blanket is comprised of a ceramic core having an interior engine engaging layer and an exterior atmospheric air layer. The interior layer is comprised of an inconel or monel mesh material that provides a spacing between the engine components and the ceramic fill and prevents any engine fluids from wicking into the ceramic fill. The exterior layer is comprised of a Teflon layer that is substantially impervious to petroleum based products and solvents.

The present invention provides a plurality of closure means whereby said insulative blanket can be attached therethrough.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 9 is an alternate closure method using stainless steel wire lacing, eye hooks and eye loops.

LIST OF REFERENCE NUMERALS

Figure 1:
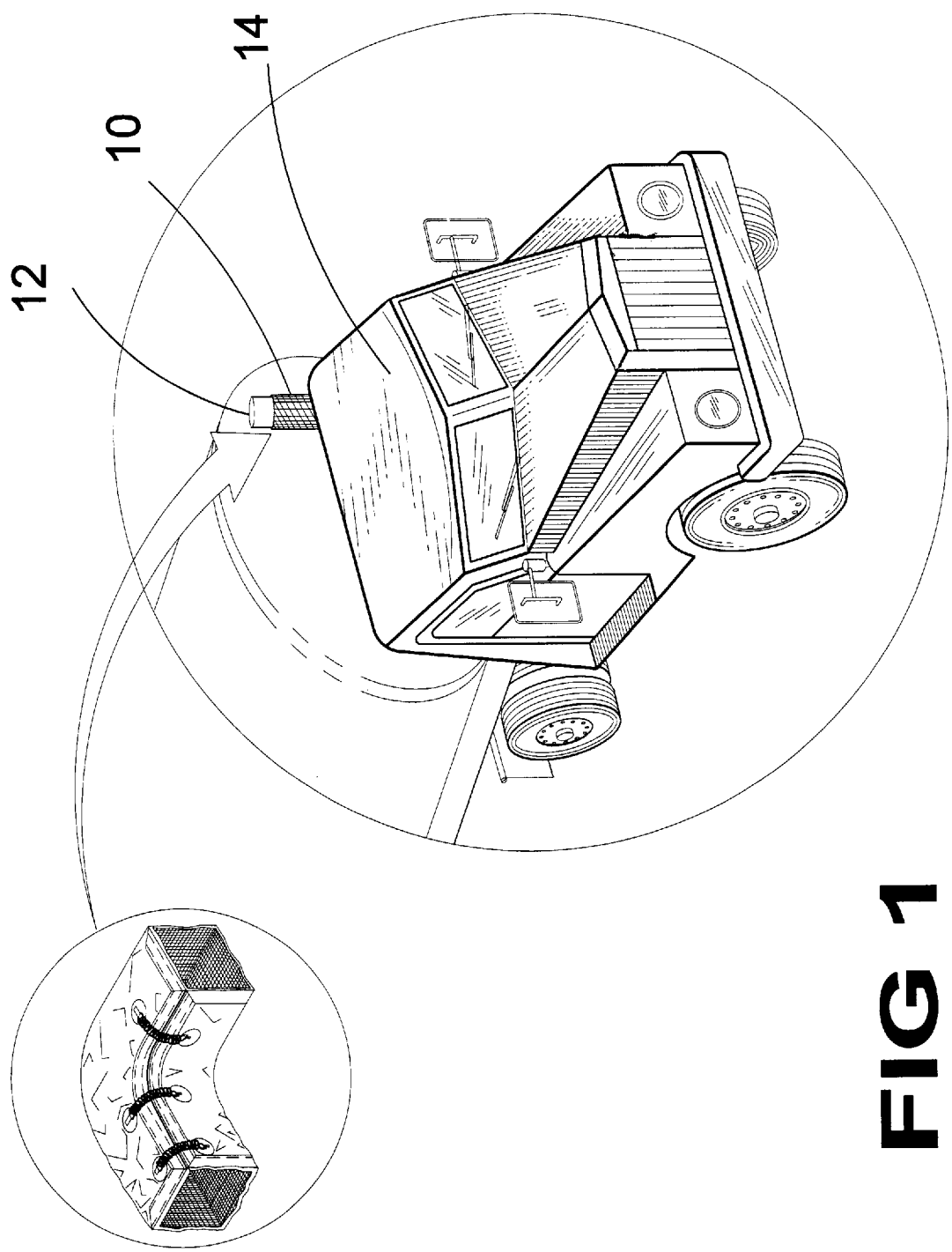
FIG. 1 is a pictorial view of the present invention the heat blocking insulation blanket mounted to the exhaust pipe of a heavy duty truck. The heat blocker is a specialized insulation blanket for engine exhaust systems.

With regard to reference numerals used, the following numbering is used throughout the drawings.

10 present invention
12 exhaust pipe
14 vehicle
16 edge guard seam protection
18 inconel or monel thread
20 iconel/ monel mesh
22 ceramic filling
24 outer shell
26 closure springs
28 inside seams
30 outside seams
32 inconel/monel liner
34 mating hook and loop material
36 steel wire lacing
38 eye hook
40 eye loop
42 L-shaped hook
44 loop
46 spring loop
48 stud
50 rivet face

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being a device for insulating engine exhaust systems.

Turning to FIG. 1, shown therein is a pictorial view of the present invention 10 being a heat blocking insulation blanket mounted to the exhaust pipe 12 of a heavy duty truck 14. The heat blocker of the present invention is a specialized insulation blanket for engine exhaust systems or other hot components of equipment.

Figure 2:
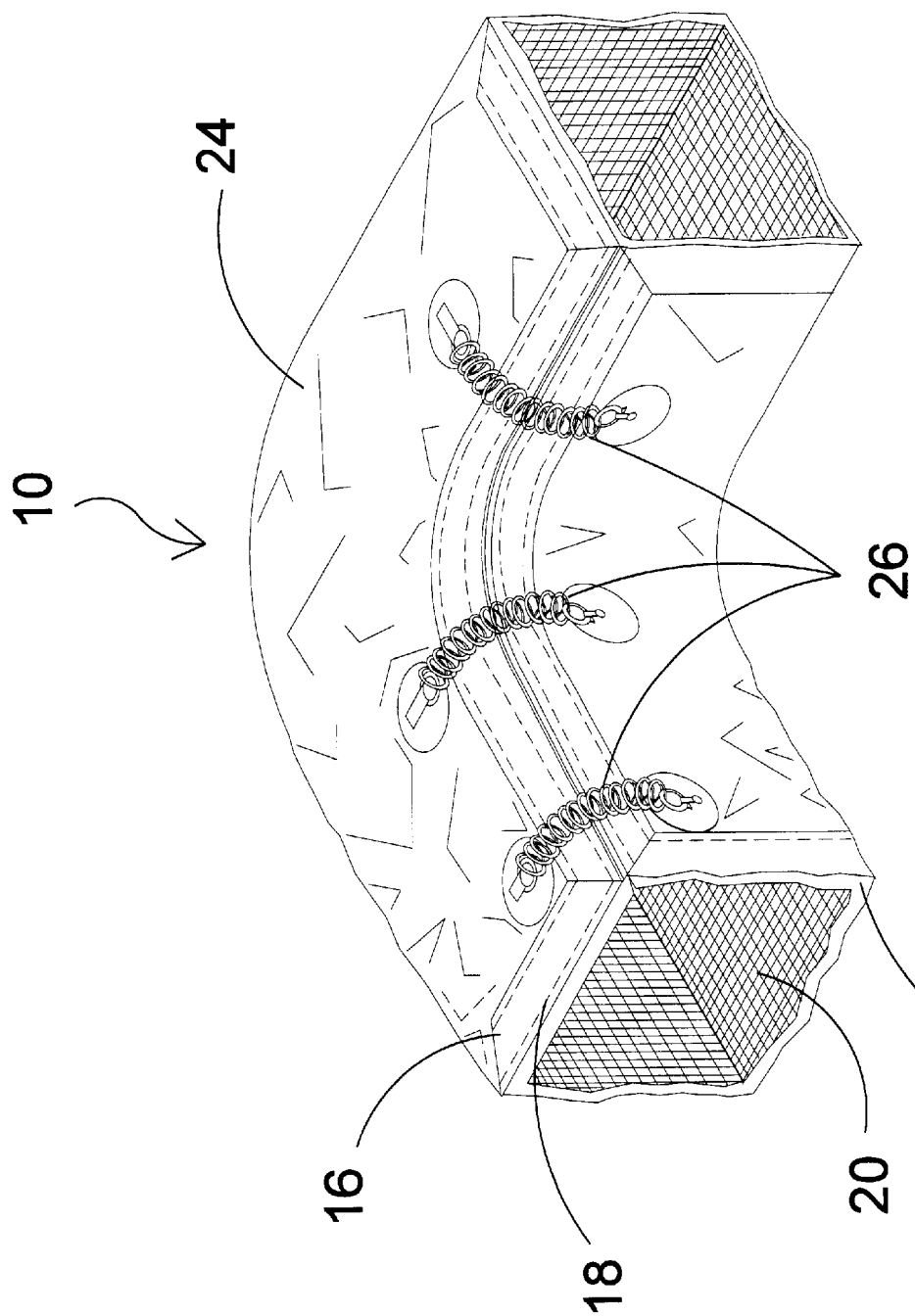
FIG. 2 is a perspective view of the present invention illustrating the edge guard seam protection, the inconel thread, monel mesh, ceramic filling, Teflon bonded fiberglass outer shell and closure tension springs.

Turning to FIG. 2, shown therein is a perspective view of the present invention 10 illustrating the edge guard seam protection 16, the inconel thread 18, monel or iconel mesh 20, ceramic filling 22, Teflon bonded fiberglass outer shell 24 and the multiple closure and tension springs 26.

Figure 3:
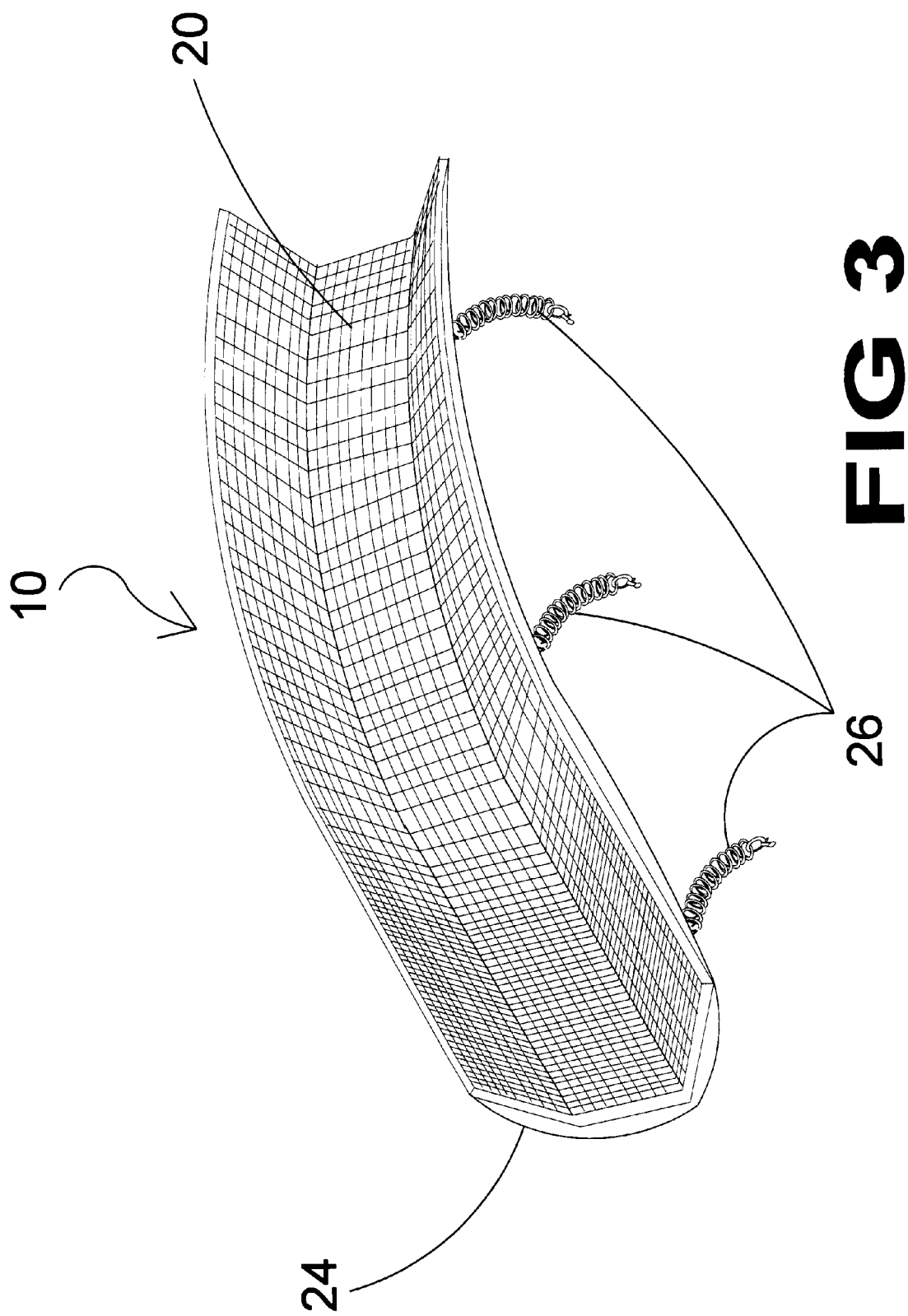
FIG. 3 is an open inside view of the present invention illustrating the Teflon bonded fiberglass outer shell in which protects against engine fluids and is superior in strength. Also illustrating the monel mesh providing air space between the exhaust component and the blanket. Also shown, the spring closures that maintain a constant tension on the blanket, and reducing installation time.

Turning to FIG. 3, shown therein is an open inside view of the present invention 10 illustrating the Teflon bonded fiberglass outer shell 24 in which protects against engine fluids and is superior in strength. Also illustrated is the monel mesh 20 inner layer which provides an air space between the exhaust component and the blanket. Also shown are the multiple spring closures 26 that maintain a constant tension on the insulation blanket and reduce installation time.

Figure 4:
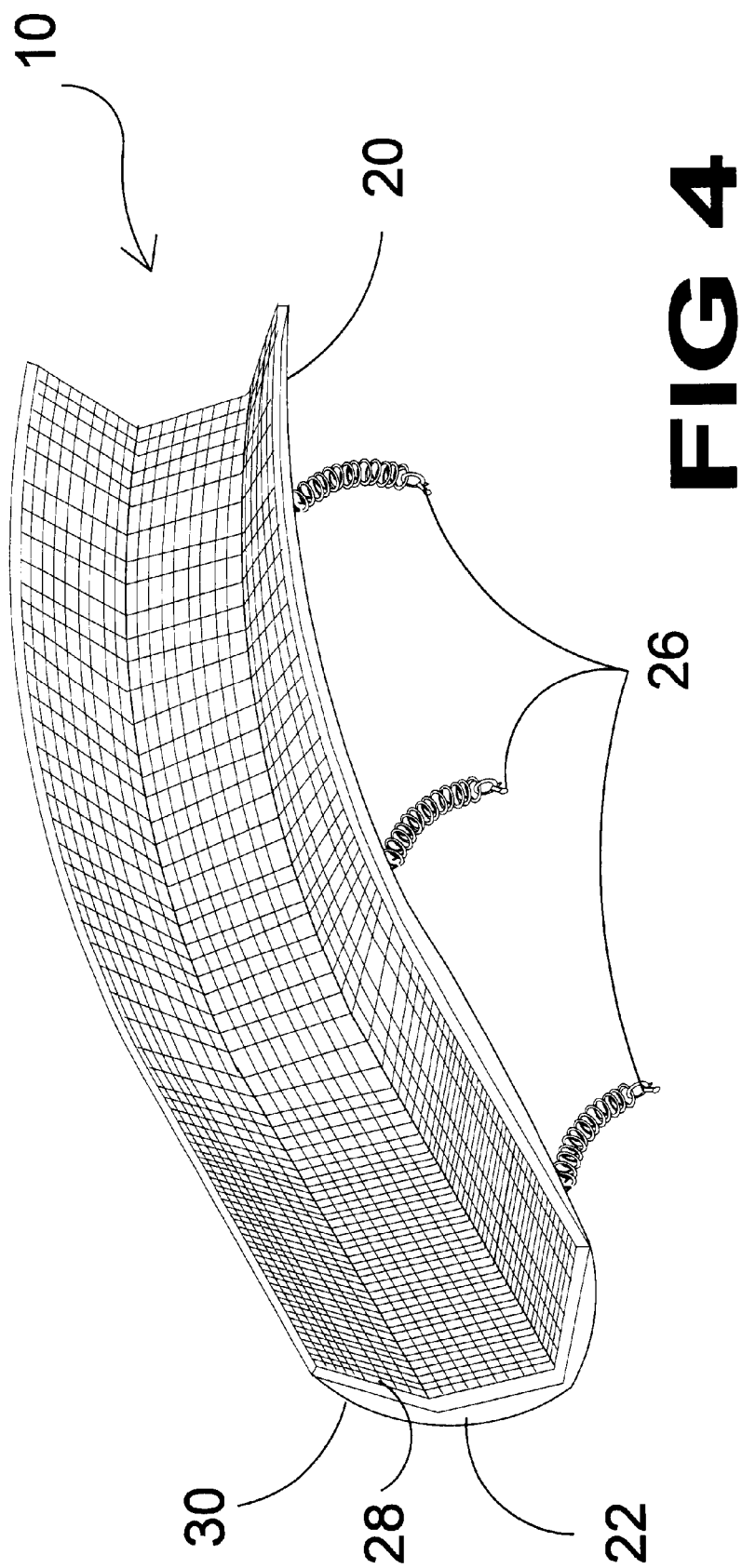
FIG. 4 is a open inside view illustrating the separate inside and outside seams, the ceramic filling in which will not degrade or turn to powder or cause skin irritation to the installer, and the inconel liner providing a high temperature barrier.

Turning to FIG. 4, shown therein is an open inside view of the present invention 10 illustrating the separate inside 28 and outside 30 seams, the ceramic filling 22 which will not degrade or turn to powder or cause skin irritation to the installer, and the inconel or monel liner 20 (see FIG. 7 for a detailed view) providing a high temperature barrier. The spring closures 26 are also shown.

Figure 5:
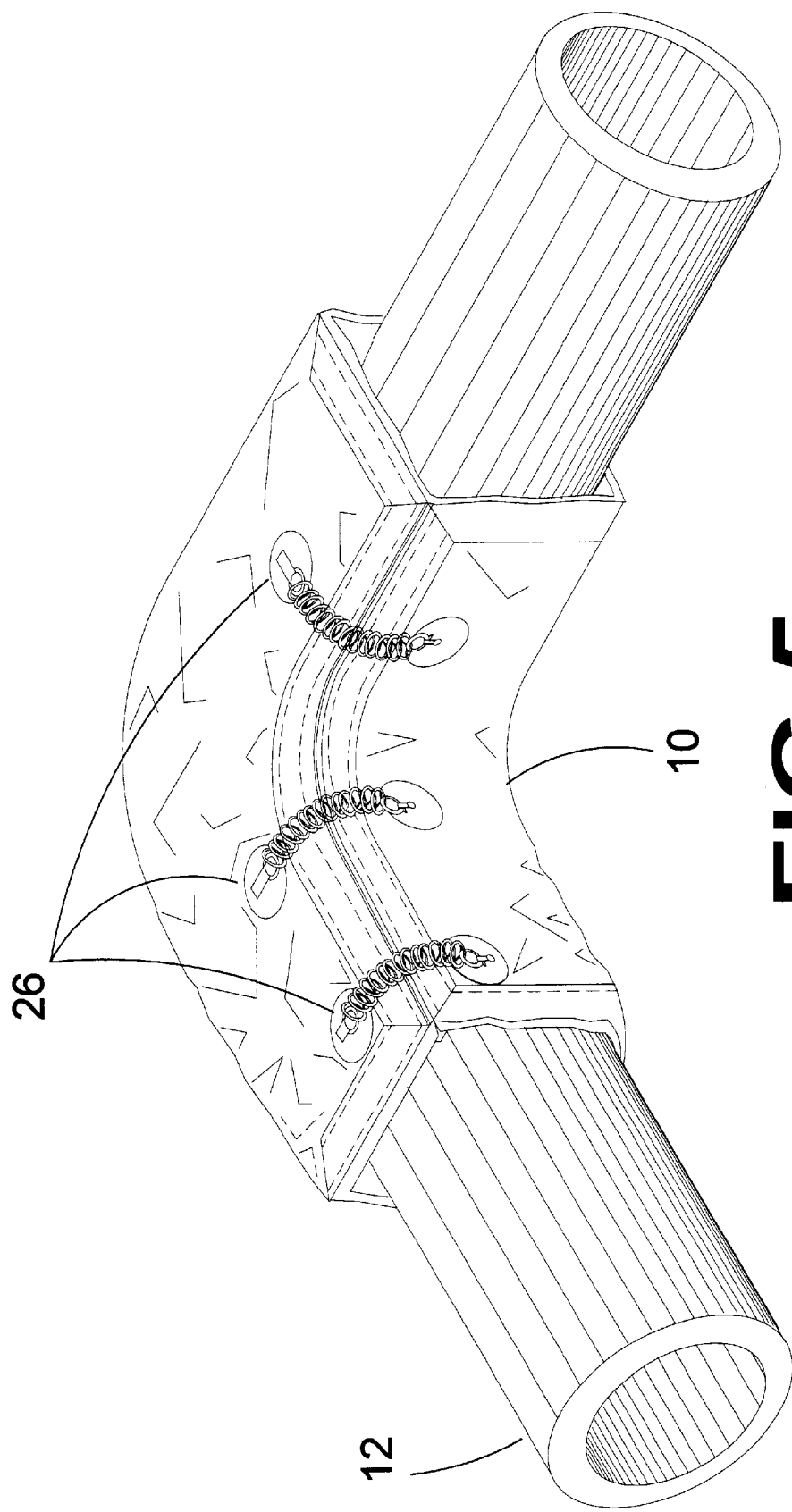
FIG. 5 is a pictorial view of the present invention showing an exhaust pipe fitted with the heat blocker of the present invention. The heat blocker is shown in the installed embodiment, illustrating the spring closures in the installed position.

Turning to FIG. 5, shown therein is a pictorial view of the present invention 10 showing an exhaust pipe 12 fitted with the heat blocker of the present invention. The heat blocker is shown in the installed embodiment, illustrating the spring closures 26 in the installed or closed position.

Figure 6:
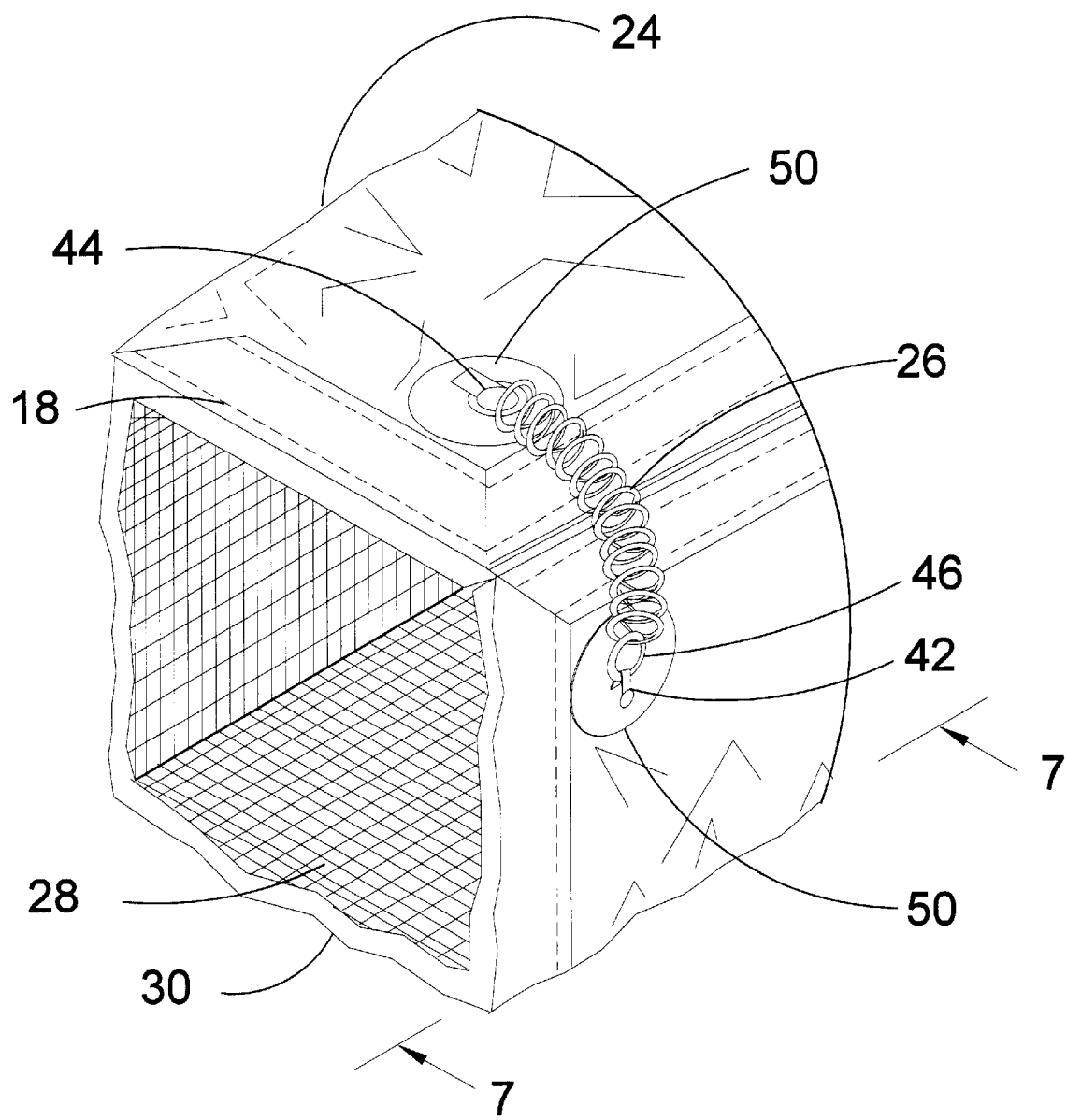
FIG. 6 is a sectional perspective view of the present invention showing the inconel thread with separate inside and outside seams in which maintains a high temperature. Also shown is the inconel liner which provides a high temperature barrier.

Turning to FIG. 6, shown therein is a sectional perspective view of the present invention 10 showing the inconel or monel thread 18 with separate inside 28 and outside 30 seams which maintain a high temperature. Also shown is the outer shell 24 which helps provide a high temperature barrier. The spring closure means 26 comprises a plurality of oppositely opposed riveted studs 48 (not shown but see FIG. 7) fixedly positioned along the edge of the insulative blanket and being riveted through the exterior layer. One riveted edge face 50 has an L-shaped appendage-like hook 42 extending away from the insulative blanket edge. The oppositely opposed rivets have a spring element fixedly positioned thereto having a loop 44 located at the distal end. The aperture of the spring loop 46 can be passed over the L-shaped appendage 42 of the opposing rivet. The spring 26 is of sufficient length as to cause the opposing edges of the insulative blanket to be brought into tensioned engagement. The purpose of the spring closure 26 is to provide means for quick installation and/or removal of the insulative blanket.

Figure 7:
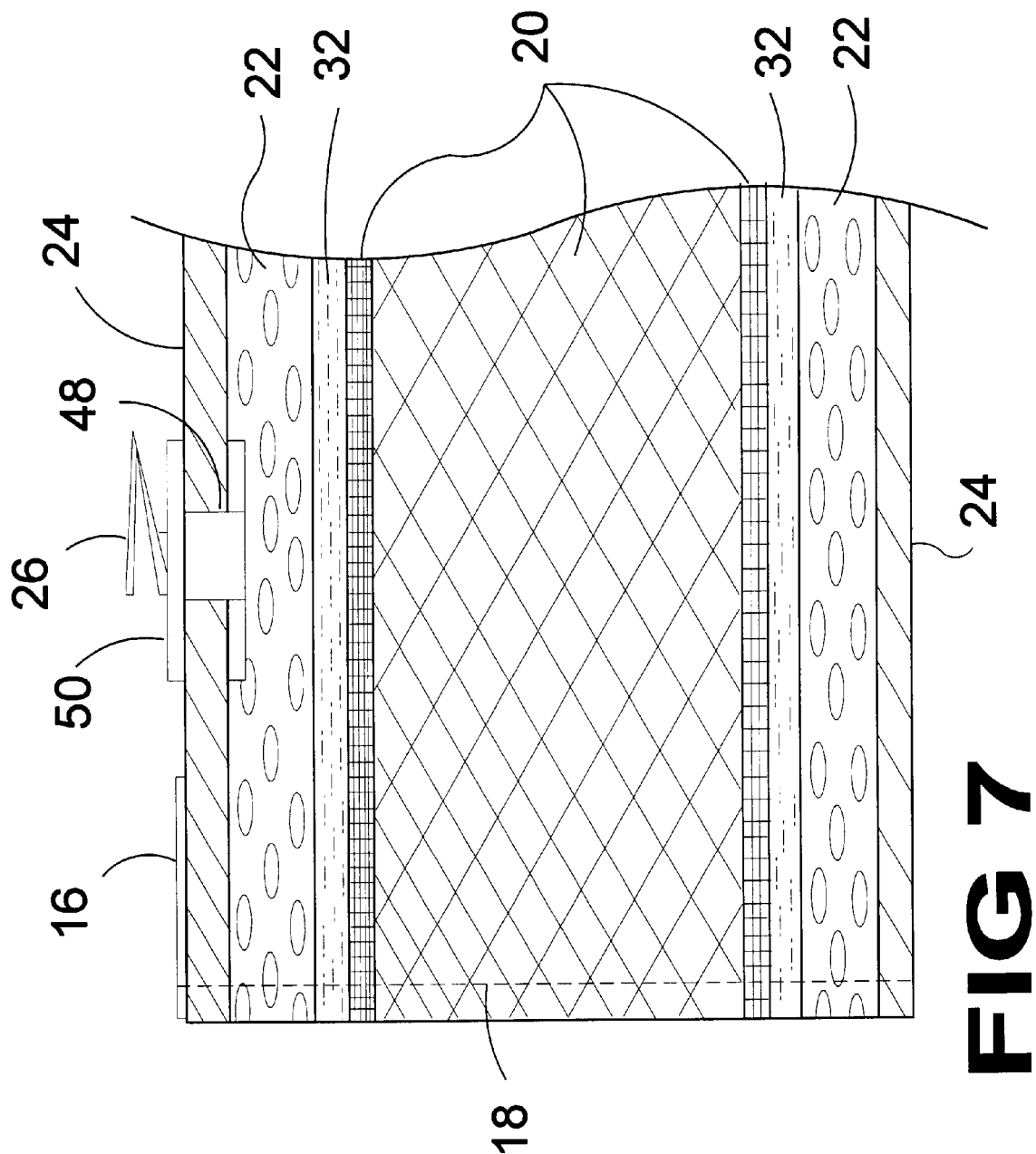
FIG. 7 is a sectional view of the present invention depicting the layers conclusive to the embodiment of the present invention.

Turning to FIG. 7, shown therein is a sectional view of the present invention depicting the layers of the present invention as previously discussed. The spring rivet stud 48 is shown along with the rivet faces 50.

Figure 8:
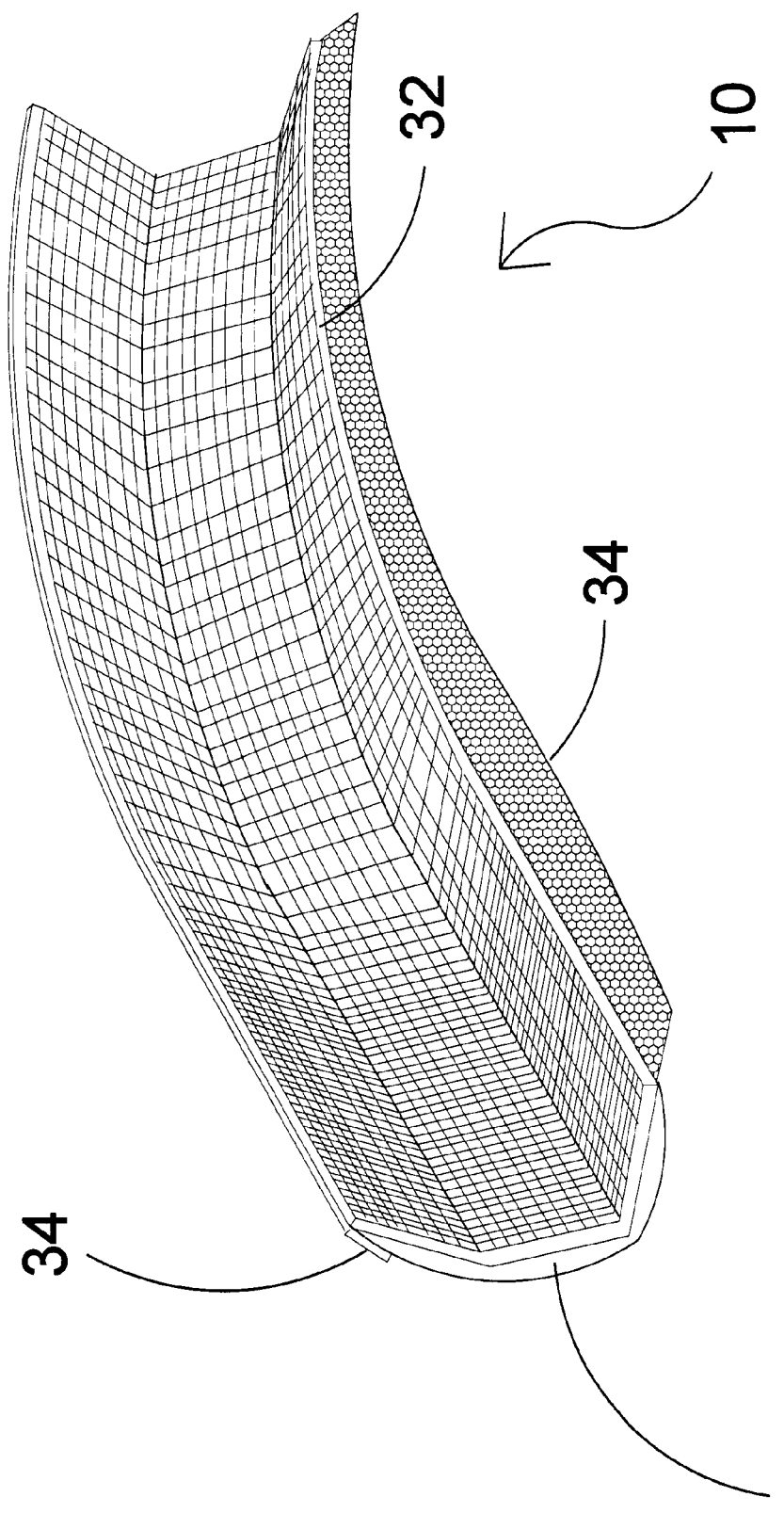
FIG. 8 is an open view of the present invention depicting an alternate closure device industrial Velcro.

Turning to FIG. 8, shown therein is an open view of the present invention 10 depicting an alternate closure device using industrial grade mating hook and loop material 34. Other elements previously disclosed are also shown. The spring rivet stud 48 is shown along with the rivet faces 50.

Turning to FIG. 9, shown therein is an alternate closure method of the present invention 10 using stainless steel wire lacing 36 strung between multiple eye hooks 38 and multiple eye loops 40.

As described in Hawley's Condensed Chemical Dictionary, Thirteenth Edition, published 1997 by Van Nostrand Reinhold, the terms inconel and monel are defined as follows: Inconel is a trademark for a series of corrosion-resistant alloys of nickel and chromium. Monel is a trademark for a series of corrosion-resistant alloys of nickel and copper. Teflon is a trademark for tetrafluoroethylene (TFE) fluorocarbon polymers.

What is claimed to be new and desired to be protected by Letters Patent is set forth in the appended claims:

I claim:

1. An apparatus for an insulating blanket having a first edge and a second edge to be wrapped about a hot component of a piece of equipment, comprising:
    a) a first, inner layer made from of an alloy of nickel and copper for placement adjacent the hot component;
    b) a second layer made from an alloy of nickel and copper which prevents passage of fluids;
    c) a third insulation layer for providing an insulation heat barrier;
    d) a fourth outer layer for providing a protective cover; and,
    e) means for closure provided for the blanket whereby the blanket is wrapped about the hot component of a piece of equipment.

2. The apparatus of claim 1, further comprising means for joining said first, second, third and fourth layers whereby said first, second, third and fourth layers are secured to each other.

3. The apparatus of claim 2, wherein said means for joining further comprises a thread made from an alloy of nickel and chromium, said thread being sewn.

4. The apparatus of claim 2, wherein said means for joining further comprises thread made from an alloy of nickel and copper, said thread being sewn.

5. The apparatus of claim 2, wherein said means for joining further comprises a seam disposed on the outside of the insulating blanket.

6. The apparatus of claim 2, wherein said means for joining further comprises a seam disposed on the inside of the insulating blanket.

7. The apparatus of claim 2, further comprising a means for a protective layer disposed along the edges of the blanket whereby said means for joining is protected.

8. The apparatus of claim 1, wherein said first inner layer further comprises a mesh of an alloy of nickel and copper.

9. The apparatus of claim 1, wherein said first inner layer further comprises mesh of an alloy of nickel and chromium.

10. The apparatus of claim 1, wherein said second layer further comprises of an alloy of nickel and chromium.

11. The apparatus of claim 1, wherein said third insulation layer further comprises ceramic filling.

12. The apparatus of claim 1, wherein said fourth outer layer further comprises fiberglass.

13. The apparatus of claim 12, wherein said fiberglass fourth layer further comprises a TFE fluorocarbon polymer.

14. The apparatus of claim 1, wherein said means for closure further comprises a plurality of springs.

15. The apparatus of claim 14, wherein said springs have a first end and a second end, said first end of said spring being fixedly attached to a plurality of rivets disposed on a first edge of the insulating blanket, and said second end of said spring being removably attached to a plurality of rivets disposed on a second edge of the insulating blanket.

16. The apparatus of claim 1, wherein said means for closure further comprises mating hook and loop material disposed on the first and second edge of the blanket.

17. The apparatus of claim 1, wherein said means for closure further comprises a plurality of eye hooks disposed on the first edge of the blanket and a plurality of eye loops disposed on the second edge of the blanket further comprising steel wire lacing connecting said eye hooks to said eye loops.

\* \* \* \* \*